United States Patent Office 3,167,338
Patented Jan. 26, 1965

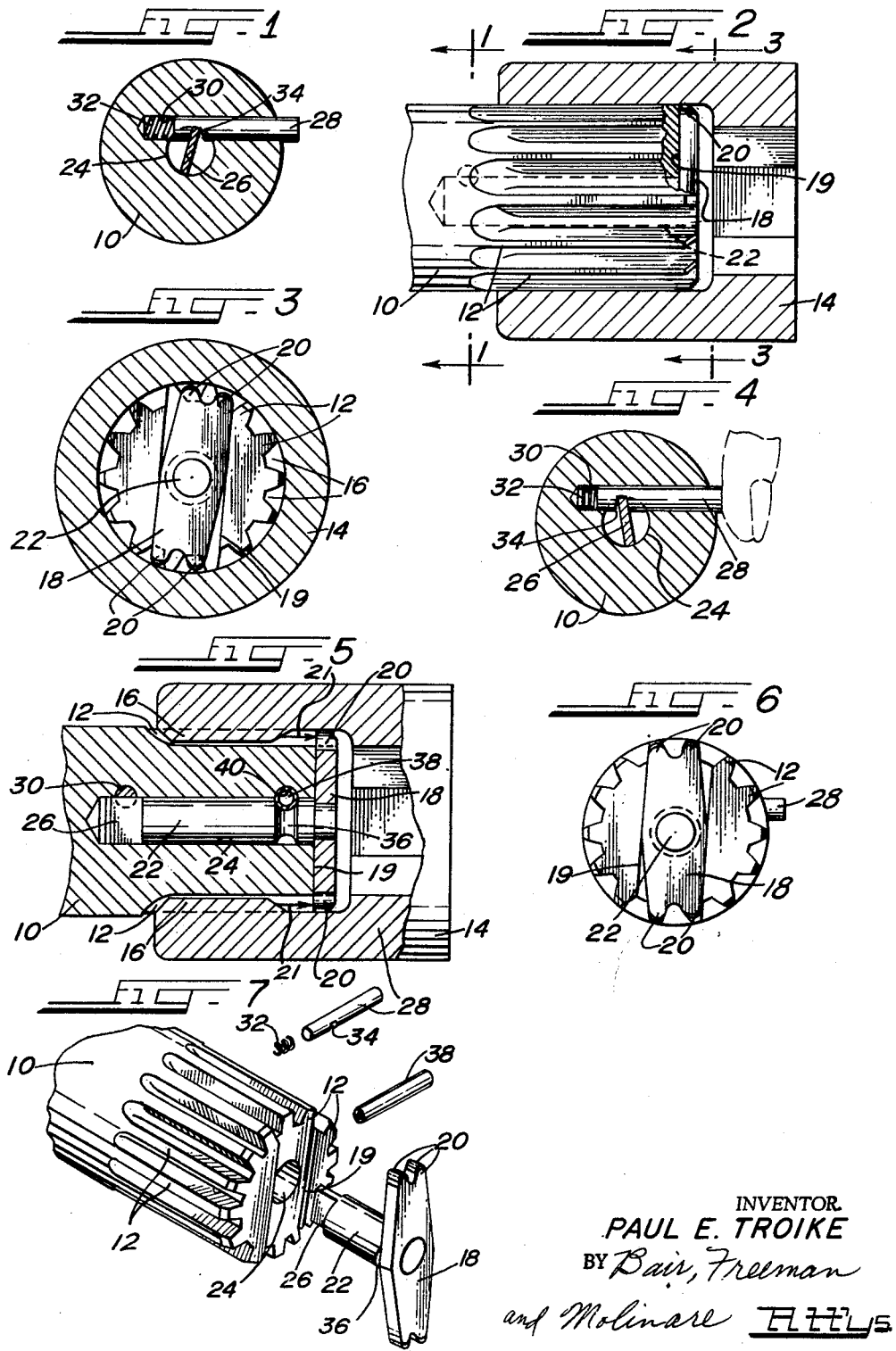

3,167,338
SOCKET RETAINER MECHANISM
Paul E. Troike, Hamilton, Ind., assignor to The Aro Corporation, Bryan, Ohio, a corporation of Ohio
Filed Oct. 18, 1963, Ser. No. 317,248
8 Claims. (Cl. 287—119)

This invention relates to a socket retainer mechanism particularly designed for spline-driven sockets such as those used in impact wrenches in which the shank and socket have a splined connection with each other.

One object of the invention is to provide a retaining mechanism which provides functional means for retaining the socket on the shank in such manner that quick change of sockets is possible with ease and simplicity of operation.

Another object is to provide a socket retainer mechanism that eliminates the need for tools or accessories of any kind to accomplish release or locking of the retainer mechanism.

Still another object is to provide socket retainer mechanism which does not sacrifice strength in the driving portion or shank of the impact anvil.

A further object is to provide an inexpensive socket retainer means so designed that there is economy of manufacture as well as economy of maintenance as there is very little mechanism to wear during the operations of releasing and locking the socket retainer mechanisms.

Still a further object is to provide safety to operators of impact wrenches and the like and to bystanders by providing a rugged, integral locking device to secure a socket on a shank, my construction eliminating through-pins and the like commonly used which are subject to loss and replacement by pins of inferior material which creates an unsafe condition.

An additional object is to provide a socket retainer mechanism in the form of a retainer element across the outer end of a shank which is capable of movement to two different positions by the operation of a slide pin projecting from the shank, one position effecting misalignment of certain teeth of the retainer element with respect to the spline teeth so that the spline teeth of the socket cannot be disassociated from the spline teeth of the shank, and in another position aligns the teeth of the retainer element with the spline teeth so that there can be such disassociation, the slide pin being biased to a retaining position.

With these and other objects in view, my invention consists in the construction, arrangement and combination of the various parts of my socket retainer mechanism, whereby the objects above contemplated are attained, as hereinafter more fully set forth, pointed out in my claims and illustrated in detail on the accompanying drawings, wherein:

FIG. 1 is a sectional view through the shank of an impact anvil showing a slide pin for operating my socket retainer mechanism, the slide pin being in normal position; FIG. 1 being taken on the line 1—1 of FIG. 2;

FIG. 2 is a side elevation of the shank and a cross section of a socket associated therewith, FIG. 3 is a vertical sectional view on the line 3—3 of FIG. 2 showing the retainer element in retaining position;

FIG. 4 is a sectional view similar to FIG. 1 showing the slide pin in operated or unlocking position;

FIG. 5 is a sectional view similar to FIG. 2 showing the shank also in section;

FIG. 6 is a view similar to the elevational portion of FIG. 3 showing the socket retainer element in operated position for release of the socket from the shank, and FIG. 7 is an exploded perspective view of the shank and the socket retainer mechanism.

On the accompanying drawing I have used the reference numeral 10 to indicate a shank such as one of the type that forms part of the anvil of an impact wrench. The outer marginal end of the shank 10 is splined with external spline teeth 12. A socket 14 for turning a nut or bolt head is shown at 14 having internal spline teeth 16 surrounding the teeth 12 whereby a splined connection is provided between the shank 10 and the socket 14.

A socket retainer element 18 in the form of a cross bar or pair of arms extends across the outer end of the shank 10, being located in a slot 19 thereof. The element 18 has teeth 20 on its outer end shaped somewhat the same as the spline teeth 12 and 16 as shown in FIG. 6. The element 18 is mounted on and carried by a rock shaft 22, being brazed or welded thereto, and the rock shaft is oscillatable in a bore 24 of the shank 10 as shown, for instance, in FIG. 5. In order to retain the rock shaft 22 in the bore 24 the rock shaft is provided with a groove 36 and a retainer pin 38 is driven into a cross hole 40 of the shank 10. The sides of the slot 19 limit the oscillation of the socket retainer element 18 in one direction as shown in FIG. 3 and the other direction as shown in FIG. 6.

The rock shaft 22 is provided with a wing 26 at its inner end, and a slide pin 28 is mounted in a blind hole 30 extending crosswise of the shank 10 as shown in FIG. 1 and has a notch 34 receiving the edge of the wing 26. A return spring 32 is mounted in the bore 30 to normally bias the slide pin 28 to the outer position shown in FIG. 1 whereas the slide pin can be retracted by finger-pressure as shown in FIG. 4 against the bias of the spring.

PRACTICAL OPERATION

In the operation of my socket retainer mechanism, when the parts are in the position shown in FIGS. 1 and 3 it will be noted the teeth 20 are out of alignment with the teeth 12 and 16. Accordingly, the left-hand ends of the teeth 16 of the socket 14 (see arrows 21 in FIG. 5) will strike the teeth 20 if an attempt is made to withdraw the socket 14 from the shank 10. The socket is thus retained on the shank during operation of the impact tool.

When it is desired to remove the socket 14 for the purpose of replacing it with another one of a different size, the slide pin 28 is depressed as in FIG. 4 which positions the socket retainer element 18 as shown in FIG. 6. The teeth 20 are now aligned with the teeth 16 of the socket 14 so that the socket can be withdrawn. Another socket can then be readily and quickly substituted, the side pin 28 being held in the depressed position of FIG. 4 to permit same. When finger pressure is released from the slide pin it will return to the position of FIG. 1 because of the bias of the spring 32 and the socket is locked in position.

From the foregoing specification it will be obvious that the arrangement of teeth 12, 16 and 20 permit approximately one-half pitch rotational displacement of the retainer element 18 within the slot 19 of the shank 10 for either locking as in FIG. 3 or unlocking as in FIG. 6. A simple slide pin 28 provides a convenient means for manually operating the retainer element to released position, and it returns to locked position whenever finger pressure is released from the slide pin. The device comprises few parts which are readily assembled in a minimum of time and retained assembled by the retainer pin 38. The slide pin 28 is in the "normal" position of FIG. 1 due to the bias of the spring 32 in which position the teeth 20 are out of phase with the teeth 12 and 16 whereas finger pressure produced as in FIG. 4 throws the teeth into phase for permitting removal of the socket with respect to the shank.

The slide pin 28 is relatively small to minimize stress concentrations in the shank 10 of the impact anvil produced by the transverse bore 30 in which it is located. The retainer pin 38 is located in an area adjacent the outer end of the shank 10 where stress is much lower so is not detrimental to the anvil strength to any significant amount. The socket retainer element 18 and its rock shaft 22 are reversible (end-for-end in FIG. 3) in the event the upper edge of the wing 26 shown in FIG. 1 becomes worn whereupon the lower edge of the wing may be used for a comparable length of time before becoming too worn for practical operation. If replacement of parts are required it is merely necessary to remove the retainer pin 38, replace the parts 18, 22 and 28 and drive the pin into position again.

Some changes may be made in the construction and arrangement of the parts of my socket retainer mechanism without departing from the real spirit and purpose of my invention, and it is my intention to cover by my claims any modified forms of structure or use of mechanical equivalents which may reasonably be included within their scope.

I claim as my invention:

1. A socket retainer mechanism for a shank and socket having a splined connection with each other when the shank is received in the socket comprising a retainer element across the outer end of said shank, a rock shaft on which said retainer element is mounted, said shank having a bore receiving said rock shaft, said retainer element having teeth at its outer ends aligned with the teeth of said splined connection in one position of said rock shaft and out of alignment therewith in another position thereof, and means operable to rock said rock shaft.

2. A socket retainer mechanism in accordance with claim 1 having means normally biasing said rock shaft to said another position.

3. A socket retainer mechanism in accordance with claim 2 wherein said first means is in the form of a slide element projecting from the circumference of said shank and adapted to be finger-depressed against said bias.

4. A socket retainer mechanism in accordance with claim 1 wherein said means is in the form of a slide pin having an operative connection with said rock shaft.

5. A socket retainer mechanism in accordance with claim 4 wherein said operative connection comprises a wing, said slide pin having a notch receiving the edge of said wing.

6. A socket retainer mechanism in accordance with claim 4 wherein a spring is provided to normally bias said slide pin to extended position.

7. A socket retainer mechanism in accordance with claim 1 wherein said outer end of said shank has a cross slot receiving said retainer element, the size of said slot limiting the oscillation of said retainer element to the two positions mentioned.

8. A socket retainer mechanism in accordance with claim 7 wherein said first means is in the form of a slide pin having an operative connection with said rock shaft, and a spring is provided to extend said slide pin to a position wherein said retainer element occupies said another position.

References Cited in the file of this patent

UNITED STATES PATENTS

| | | |
|---|---|---|
| 2,460,555 | Von Voigtlander | Feb. 1, 1949 |
| 2,948,559 | Recker | Aug. 9, 1960 |
| 3,098,859 | Sindelar | July 16, 1963 |